US011239479B2

(12) United States Patent
Katikaneni et al.

(10) Patent No.: US 11,239,479 B2
(45) Date of Patent: Feb. 1, 2022

(54) IGNITION METHOD OF FUEL REFORMER USING PARTIAL OXIDATION REACTION OF THE FUEL FOR SOFC FUEL CELL START-UP

(71) Applicants: Saudi Arabian Oil Company, Dhahran (SA); Korea Advanced Institute of Science and Technology, Daejeon (KR)

(72) Inventors: Sai P. Katikaneni, Dhahran (SA); Joongmyeon Bae, Daejeon (KR); Jiwoo Oh, Daejeon (KR); Minseok Bae, Daejeon (KR); Dongyeon Kim, Daejeon (KR)

(73) Assignees: Saudi Arabian Oil Company, Dhahran (SA); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/830,649

(22) Filed: Mar. 26, 2020

(65) Prior Publication Data
US 2021/0305604 A1    Sep. 30, 2021

(51) Int. Cl.
*H01M 8/04701*    (2016.01)
*H01M 8/04223*    (2016.01)
(Continued)

(52) U.S. Cl.
CPC ... *H01M 8/04738* (2013.01); *H01M 8/04268* (2013.01); *H01M 8/04776* (2013.01); *H01M 8/0618* (2013.01)

(58) Field of Classification Search
CPC ......... H01M 8/04738; H01M 8/04268; H01M 8/04776
See application file for complete search history.

(56) References Cited

U.S. PATENT DOCUMENTS 6,156,084 A    12/2000  Bonville, Jr. et al.
6,521,204 B1    2/2003  Borup et al.
(Continued)

FOREIGN PATENT DOCUMENTS

EP    112613 B1    3/1991
EP    2767506 A1    8/2014
(Continued)

OTHER PUBLICATIONS

International Search Report and Written Opinion dated Mar. 19, 2021 pertaining to International application No. PCT/US2020/064833 filed Dec. 14, 2020, 14 pgs.
(Continued)

*Primary Examiner* — Olatunji A Godo
(74) *Attorney, Agent, or Firm* — Dinsmore & Shohl LLP

(57) ABSTRACT

In accordance with one or more embodiments of the present disclosure, a method of starting a fuel reformer including a heating element and a subsequent autothermal reformer includes contacting a first fluid comprising oxygen with the heating element, passing the first fluid into the autothermal reformer to preheat a reformer catalyst within the autothermal reformer to a first temperature, reducing flow of the first fluid into the autothermal reformer, introducing a fuel into the autothermal reformer subsequent to preheating the reformer catalyst to initiate a partial oxidation reaction and generating additional heat, increasing flow of the fuel and first fluid to initiate autothermal reforming, and controlling the temperature of the reformer catalyst by supplying a cooling fluid, the first fluid, and the fuel and adjusting flow of each.

22 Claims, 3 Drawing Sheets

(51) Int. Cl.
*H01M 8/04746* (2016.01)
*H01M 8/0612* (2016.01)

(56) References Cited

U.S. PATENT DOCUMENTS

| | | | |
|---|---|---|---|
| 6,635,372 | B2 | 10/2003 | Gittleman |
| 6,994,930 | B1* | 2/2006 | Geisbrecht .......... H01M 8/0662 |
| | | | 429/425 |
| 7,323,159 | B2 | 1/2008 | Ahluwalia et al. |
| 8,557,189 | B2 | 10/2013 | Roychoudhury et al. |
| 8,563,184 | B2 | 10/2013 | Kaupert et al. |
| 9,199,846 | B2 | 12/2015 | Roychoudhury et al. |
| 9,337,505 | B2 | 5/2016 | Roychoudhury et al. |
| 2002/0007595 | A1* | 1/2002 | Maier-Roeltgen ...... C01B 3/025 |
| | | | 48/116 |
| 2004/0194383 | A1* | 10/2004 | Wheat ..................... B01J 19/24 |
| | | | 48/197 R |
| 2009/0165368 | A1* | 7/2009 | Liu ......................... C01B 3/323 |
| | | | 44/451 |
| 2009/0186246 | A1 | 7/2009 | Heo et al. |
| 2009/0223861 | A1* | 9/2009 | Sugiura ............... H01M 8/0612 |
| | | | 208/134 |
| 2010/0104897 | A1 | 4/2010 | Bae et al. |
| 2012/0021307 | A1 | 1/2012 | Watanabe et al. |
| 2016/0293984 | A1 | 10/2016 | Kang et al. |
| 2018/0358639 | A1 | 12/2018 | Yajima et al. |
| 2019/0148744 | A1 | 5/2019 | Choi et al. |

FOREIGN PATENT DOCUMENTS

| | | | |
|---|---|---|---|
| EP | 1645540 | B1 | 6/2017 |
| JP | 2004031025 | A | 1/2004 |
| JP | 2005255896 | A | 9/2005 |
| JP | 2006278074 | A | 10/2006 |
| JP | 2006351293 | A | 12/2006 |
| JP | 4885917 | B2 | 6/2010 |
| JP | 6182450 | B2 | 8/2017 |
| KR | 100718106 | B1 | 5/2007 |
| KR | 20090079517 | A | 7/2009 |
| KR | 101077929 | B1 | 10/2011 |
| KR | 101172841 | B1 | 8/2012 |
| KR | 101179539 | B1 | 8/2012 |
| KR | 101276677 | B1 | 6/2013 |
| WO | 2009057648 | A1 | 5/2009 |
| WO | 2016114214 | A1 | 7/2016 |

OTHER PUBLICATIONS

International Search Report and Written Opinion dated Feb. 22, 2021 pertaining to International application No. PCT/US2020/060096 filed Nov. 12, 2020, 15 pgs.
Araki S. et al. "Start-up procedures in autothermal reforming of biogas over a Ni based catalytic monolith", Catalysis Communications, Elsevier, Amsterdam, NL, vol. 10, No. 9, Apr. 25, 2009, pp. 1300-1304.
Springmann S. et al. "Cold start simulations of a gasoline based fuel processor for mobile fuel cell applications", Journal of Power Sources, Elsevier SA, CH, vol. 128, No. 1, Mar. 29, 2004, pp. 13-24.
International Search Report and Written Opinion dated Oct. 4, 2021 pertaining to International application No. PCT/US2021/038440 filed Jun. 22, 2021, 13 pages.
Yoon, S. et al. "Development of a self-sustaining kWe-class integrated diesel fuel processing system for solid oxide fuel cells", International Journal of Hydrogen Energy, Elsevier Science Publishers B.V., Barking, GB, vol. 36, No. 16, Oct. 1, 2010, p. 10302-10310.

* cited by examiner

IGNITION METHOD OF FUEL REFORMER USING PARTIAL OXIDATION REACTION OF THE FUEL FOR SOFC FUEL CELL START-UP

BACKGROUND

Field

Embodiments of the present disclosure generally relate to processes for producing hydrogen for use in fuel cells and, more specifically, relate to processes for starting a fuel reformer by generating heat in an autothermal reformer component of the fuel reformer.

Technical Background

Fuel cells are power generation systems that convert the chemical reaction energy of hydrogen and oxidant contained in hydrocarbon-based materials, such as methanol, ethanol, natural gas, and diesel, into direct electrical energy. Exemplary fuel cells include a polymer electrolyte membrane fuel cell (PEMFC), a direct methanol fuel cell (DMFC), and a solid oxide fuel cell (SOFC). Each offers its own advantages and disadvantages.

The hydrogen for the fuel cell may be obtained by reforming a hydrocarbon-based fuel, such as methane, methanol, natural gas, gasoline, or diesel, using a fuel reformer. Fuel reformers may perform one or more of steam reforming, partial oxidation reforming, or autothermal reforming. Steam reformers are suitable for fuels with a high hydrogen content in the reformed gas and short carbon chains, such as methane and natural gas. Also, the steam reforming reaction is suitable for an SOFC system having a high operating temperature because the reformed gas also exists at a high temperature. However, because a steam reformer consumes a large amount of heat to generate the steam, the reactor design is necessarily quite complicated.

Partial oxidation reforming is a method of acquiring hydrogen by an exothermic reaction of fuel and oxygen, and the hydrogen yield is relatively lower than that of steam reforming. However, no additional external heat supply is required.

Autothermal reforming combines steam reforming and partial oxidation reforming, using a reformer catalyst, allowing for a more effective reactor design. No additional heat supply from the outside is required. However, when diesel fuel is used in autothermal reforming, the reformer catalyst may be prematurely spent due to an unstable temperature distribution throughout the system, especially when improper start-up conditions are used.

SUMMARY

There is a continual need for effective fuel reformers and methods of starting such fuel reformers in a manner that protects the reformer catalyst from accelerated degradation. It has been discovered that an efficient design of a fuel reformer start-up procedure includes sequentially increasing a heat supply using only a fluid containing oxygen, a fuel, and a catalyst to perform a partial oxidation reaction within the fuel reformer.

According to one embodiment, a method of starting a fuel reformer, which includes a heating element and an autothermal reformer disposed at a rear end of the heating element, includes contacting a first fluid comprising oxygen with the heating element, passing the first fluid into the autothermal reformer to preheat a reformer catalyst contained within the autothermal reformer to a first temperature, reducing flow of the first fluid into the autothermal reformer, introducing a fuel into the autothermal reformer subsequent to preheating the reformer catalyst to initiate a partial oxidation reaction within the autothermal reformer to generate additional heat, increasing flow of the fuel and the first fluid to initiate autothermal reforming, and controlling the temperature of the reformer catalyst by supplying a cooling fluid, the first fluid, and the fuel to the autothermal reformer and adjusting flow of each of the cooling fluid, the first fluid, and the fuel.

According to another embodiment, a method of starting a diesel fuel reformer, which includes a heating element and an autothermal reformer disposed at a rear end of the heating element, includes contacting air with the heating element and the autothermal reformer to preheat a reformer catalyst contained within the autothermal reformer to a first temperature, reducing flow of the air into the autothermal reformer, introducing diesel into the autothermal reformer subsequent to preheating the reformer catalyst to initiate a partial oxidation reaction within the autothermal reformer to generate additional heat, increasing flow of the diesel and the air to initiate autothermal reforming, and controlling the temperature of the reformer catalyst by supplying a cooling fluid comprising water, the air, and the diesel to the autothermal reformer and adjusting flow of each of the water, the air, and the diesel.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

Figure (FIG. 1 is a schematic of a fuel reformer suitable for embodiments of the methods described herein.

DETAILED DESCRIPTION

Figure 1:
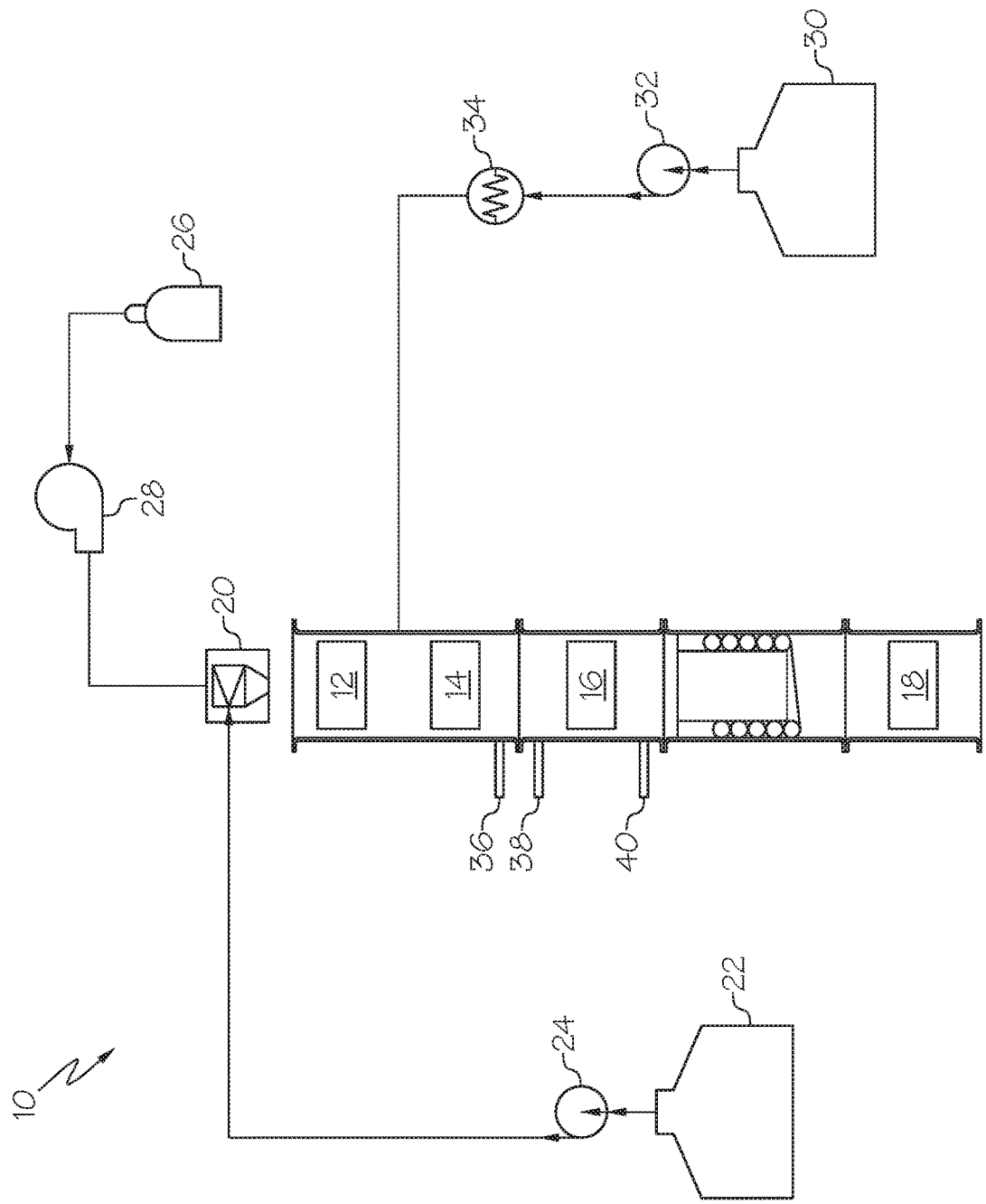

FIG. 1 provides a schematic of an exemplary fuel reformer 10 in which methods according to embodiments described herein may be performed. The fuel reformer includes a heating element 12 disposed at the front end, an autothermal reformer 14 disposed at the rear end of the heating element 12, a post-reformer 16 disposed at the rear end of the autothermal reformer 14, a desulfurization unit 18 disposed at the rear of the post-reformer 16, and a nozzle unit 20 for regulating the mixing of the diesel fuel and the fluid supplied.

The nozzle unit 20 may transfer fuel at room temperature from a fuel reservoir 22 through a fuel pump 24, which supplies the appropriate amount of fuel to the nozzle unit 20. The fuel may be selected from diesel, gasoline, heavy naphtha, jet fuel (such as JP-8, for example), and combinations of one or more thereof. The feed rate of fuel in liters per minute (LPM, or L/min) may be, for example, the feed rate of fuel required for a desired fuel cell power output in Watts (W).

A fluid comprising oxygen may be supplied to the nozzle unit 20 from a fluid reservoir 26 through a blower 28. This fluid may be selected from air, pure oxygen, and combinations thereof. The fluid may be supplied to the nozzle from the fluid reservoir 26, for example, at a flow rate required for autothermal reforming of the fuel. The amount of fluid to be supplied may be calculated based on the amount of fuel necessary for the desired fuel cell power output. The nozzle unit 20 may be a two-fluid nozzle configured for atomizing the fuel. Atomized fuel may be more efficiently converted in the fuel reformer to the hydrogen necessary for operation of the fuel cell (not shown) when compared to conversion of fuel which was not fully atomized. Atomization of the fuel results in the formation of a fine mist with increased surface area for interaction with oxygen and the catalyst of the fuel reformer.

The autothermal reformer 14 functions to generate hydrogen-rich gas supplied to a fuel cell using fuel, the fluid, and a cooling fluid. In one embodiment, the autothermal reformer 14 includes a monolithic catalyst, such that an active catalyst is coated on a monolith. Exemplary active catalysts include compounds comprising nickel, platinum, rhodium, ruthenium, and combinations of two or more thereof. An exemplary monolith includes cordierite, a silicate having an $Al_2O_3+SiO_2$ ceramic structure, although any metal-based monolith may be used.

The cooling fluid is used to help regulate the temperature within the autothermal reformer 14. Exemplary cooling fluids include water; halomethanes (for example R-12 and R-22); anhydrous ammonia; ethylene glycol; diethylene glycol; propylene glycol; betaine; polyalkylene glycol; mineral oils, such as polyphenyl ether, an eutectic mixture of diphenyl ether and biphenyl, and polychlorinated biphenyls and polychlorinated terphenyls; silicon oils and fluorocarbon oils; fuels, such as kerosene, other jet fuels; liquefied gases, such as carbon dioxide, nitrogen, and hydrogen; nanofluids; and combinations of two or more thereof.

Meanwhile, in the process of performing the autothermal reforming reaction, steam reforming may also occur if water is used as the cooling fluid. An appropriate amount of water may be supplied from a fluid reservoir 30 through a fluid pump 32. If water is used as the cooling fluid mentioned above, the fluid reservoir 30 may also contain the cooling fluid, as is shown in FIG. 1. However, the water used for steam reforming, in principle, may also be different from the cooling fluid. The water may be allowed to contact one or more heat exchangers 34 to reach an elevated temperature. For example, the water vapor may reach a temperature of 400° C. to 500° C.

The post-reformer 16 may be used for converting a lower hydrocarbon, such as ethylene ($C_2H_4$), which has not been converted into hydrogen after passing through the autothermal reformer 14. A lower hydrocarbon, as used herein, refers to a hydrocarbon having a carbon number of four or less. A monolithic catalyst similar to that used in the autothermal reformer 14, with a platinum-based active catalyst in lieu of the Ni-based monolithic catalyst, may be used in the post-reformer 16. Other catalysts, such as rhodium, ruthenium, or mixtures thereof, may also be used in the post-reformer 16. The operating temperature of the post-reformer 16 may be between 650° C. and 800° C.

A desulfurization unit 18 may be used to decrease the amount of sulfur in the hydrogen-rich gas supplied to a fuel cell. An exemplary desulfurization unit 18 may include a zinc oxide (ZnO) based absorbent to remove sulfur from the hydrogen-rich gas. The desulfurization unit 18 may be operated at temperature in the range of from 300° C. to 400° C. or from 310° C. to 390° C. or from 320° C. to 380° C. or from 330° C. to 370° C. or from 340° C. to 360° C. or even at about 350° C.

The fuel reformer 10 may be initiated in accordance with the following start-up method overview. The method includes contacting a first fluid comprising oxygen with the heating element. Then, the first fluid, which has an elevated temperature from contacting the heating element, may be passed into the autothermal reformer to preheat the reformer catalyst to a first temperature, followed by reducing flow of the first fluid into the autothermal reformer. A fuel may then be introduced into the autothermal reformer subsequent to preheating the reformer catalyst to initiate a partial oxidation reaction within the autothermal reformer. This partial oxidation reaction generates additional heat. Flow of the fuel and the first fluid may then be increased to initiate autothermal reforming, and the temperature of the reformer catalyst may be controlled by supplying a cooling fluid, the first fluid, and the fuel to the autothermal reformer and adjusting flow of each.

Now in more detail, an external heat transfer process may be performed using the fluid supplied to the nozzle unit 20 from the fluid reservoir 26 through the blower 28. The fluid may be placed into contact with the heating element 12, and at least a portion of this heat may be transferred to the autothermal reformer 14 by passing the fluid through the autothermal reformer 14. A higher flow rate, relative to the flow rate when the fuel reformer is in a full operation mode, of fluid is supplied to the autothermal reformer 14 to encourage heat transfer at the initial stage of operation, thereby rapidly raising the temperature of the autothermal reformer 14 to a first desired temperature. Conveniently, a temperature probe 36 may be included directly after the autothermal reformer 14, which will allow for temperature measurements correlated with the temperature of the autothermal catalyst. For instance, the temperature may be raised to 200° C. to 250° C. and the flow rate of the fluid may be 25 L/min to 35 L/min during this initial stage. This heated fluid may be discarded as it leaves the fuel reformer, but it also may be recycled by returning the fluid from the outlet of the autothermal reformer 14 to the inlet of the autothermal reformer 14. Recycling the fluid stream allows for residual thermal energy in the fluid to be utilized and reduces the workload of the heating element.

Flow rates are expressed herein in units of L/min. These flow rates are determined to achieve a desired gas hourly space volume ("GHSV"). It will be appreciated that the GHSV for a given flow rate depends on catalyst volume with the GHSV equal to the ratio of the feed rate to the catalyst volume. Thus, as the catalyst volume increases, the flow rate should also increase. For instance, if the catalyst volume is doubled, the flow rates should double to maintain the desired GHSV value.

The term "first desired temperature," as used herein, refers to a minimum temperature required for the catalyst to ignite and/or react with the supplied fuel. At a temperature above or at the first desired temperature, the supplied fuel begins to vaporize and react with the supplied oxygen at the catalyst surface, causing the fuel to begin the cracking process. Once a first desired temperature is attained, the flow rate of the fluid may be decreased and a small amount of fuel may be added to initiate a partial oxidation reaction in the autothermal reformer 14. For instance, the flow rate of the fluid may be reduced to 10 L/min to 15 L/min and the flow rate of the fuel may be increased from 0 L/min to at least 0.5 milliliters per minute (mL/min). The partial oxidation reaction further increases the temperature in the autothermal reformer 14 to a second desired temperature higher than the first desired temperature at which the autothermal reformer 14 can self-sustain the temperature by the heat produced by the reaction taking place therein. Once this second desired temperature is attained, the heating element 12 may be deactivated. For example, when the temperature reaches 450° C. to 500° C. or more, the heating element 12 is disengaged by, for example, removing electrical power from the heating element 12.

After the partial oxidation is initiated, the flow rate of fluid may be increased again and the flow rate of the fuel may also be increased, such that the temperature again rises rapidly and autothermal reforming is initiated ("semi-autothermal reforming"). This increase in the flow rates may be performed in a stepwise fashion, and the flow rate of the fuel may be increased from the at least 0.5 mL/min to a range of approximately 1 mL/min to 2.5 mL/min. Also, in various embodiments, the flow rate of the fuel may be increased prior to, at the same time as, or subsequent to the increase in the flow rate of the first fluid.

Once semi-autothermal reforming begins, full autothermal reforming may be initiated and the temperature of the autothermal reformer 14 may be stabilized by introducing a cooling fluid and controlling the flow rates of the first fluid and the fuel. The amount of cooling fluid supplied to the autothermal reformer may be varied to achieve a desired temperature within the autothermal reformer. Conveniently, temperature probes 38 and 40 may be included directly before and after the post-reformer 16. The supply of fuel, fluid, and cooling fluid may then be adjusted to stabilize the temperature measurement output of the temperature probe 40. For example, when the supply of fuel and fluid are increased, the temperature increases. When the supply of cooling fluid is increased, the temperature decreases.

In addition, the flow rates of fuel and first fluid may be increased in a stepwise manner to further control the temperature within the autothermal reformer 14. As more fuel is added, the temperature within the autothermal reformer 14 increases because the fuel reformation reaction, which is exothermic, increases in frequency within the autothermal reformer 14. In one or more embodiments, increasing the flow of the fuel and the first fluid may be initiated upon verification of initiation of the partial oxidation reaction within the autothermal reformer.

In one or more embodiments, the measured temperature value at the rear end of the autothermal reformer 14, that is the temperature recorded by temperature probe 36, may be 700° C. to 900° C. For instance, this temperature may be 750° C. to 850° C., or about 800° C. The reforming catalyst of the autothermal reformer can be raised to the desired temperature within 30 minutes to 90 minutes, or about 60 minutes, through the above-described starting process. These times are exemplary and are dependent on the size of the fuel reformer 10. However, by adjusting the flow rates proportionally with the size of the fuel reformer 10, the times described herein may be maintained across a wide variety of sizes of the fuel reformer 10. The desired temperature may be maintained for as long as necessary to reform the desired amount of fuel.

Figure 2:
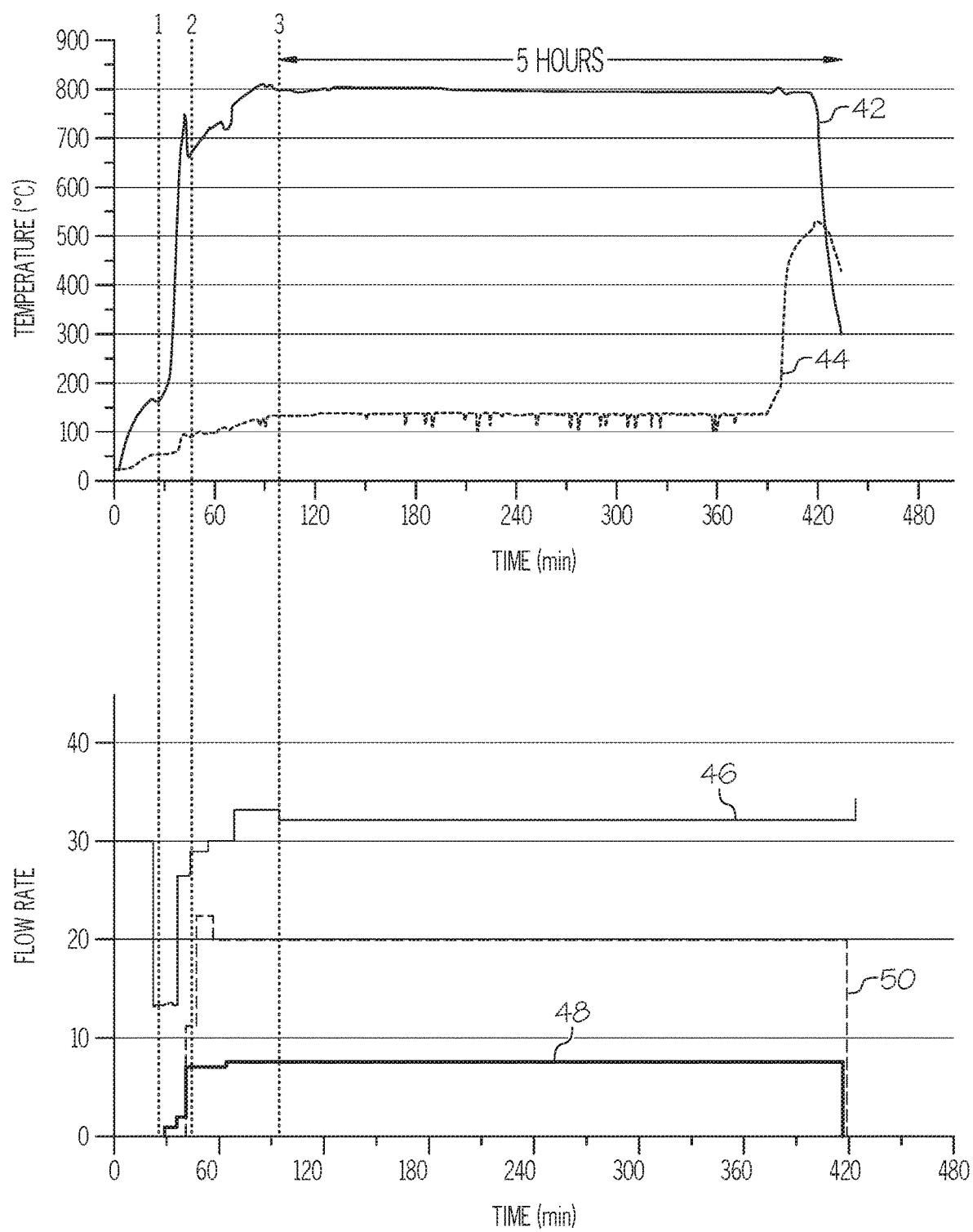
FIG. 2 is a composite chart of flowrate of the fluid (lower y-axis) and temperature (upper y-axis) over time (x-axis) according to embodiments described herein.

FIG. 2, a composite chart of flowrate of the fluid (lower y-axis) and temperature (upper y-axis) over time (x-axis), is broken into three regions. Temperatures at temperature probe 36 and temperature probe 40 are shown in the upper panel of FIG. 2 as 42 and 44, respectively. The bottom panel, with time aligned between the top and bottom panels, shows the first fluid flow rate trace 46, the fuel flow rate trace 48, and the cooling fluid flow rate trace 50. Region (1) of the chart corresponds to the time of heat transfer by contacting the fluid with the heating element 12 and then passage of the heated fluid through the autothermal reformer 14. As shown in FIG. 2, the flow rate of the fluid is rapidly increased in this region. Region (2) corresponds to a reduction in the flow rate of the fluid and introduction of the fuel, which initiates the autothermal reaction. As shown in FIG. 2, the flow rate of the fluid is rapidly decreased in this region. Region (3) corresponds to normal operation of the autothermal reformer 14 with temperature stabilization using the cooling fluid.

EXAMPLE

Using embodiments described above, an exemplary diesel fuel reformer was initiated and operated. Diesel was used as the fuel, air was used as the liquid comprising oxygen, and water was used as the cooling fluid.

Figure 3:
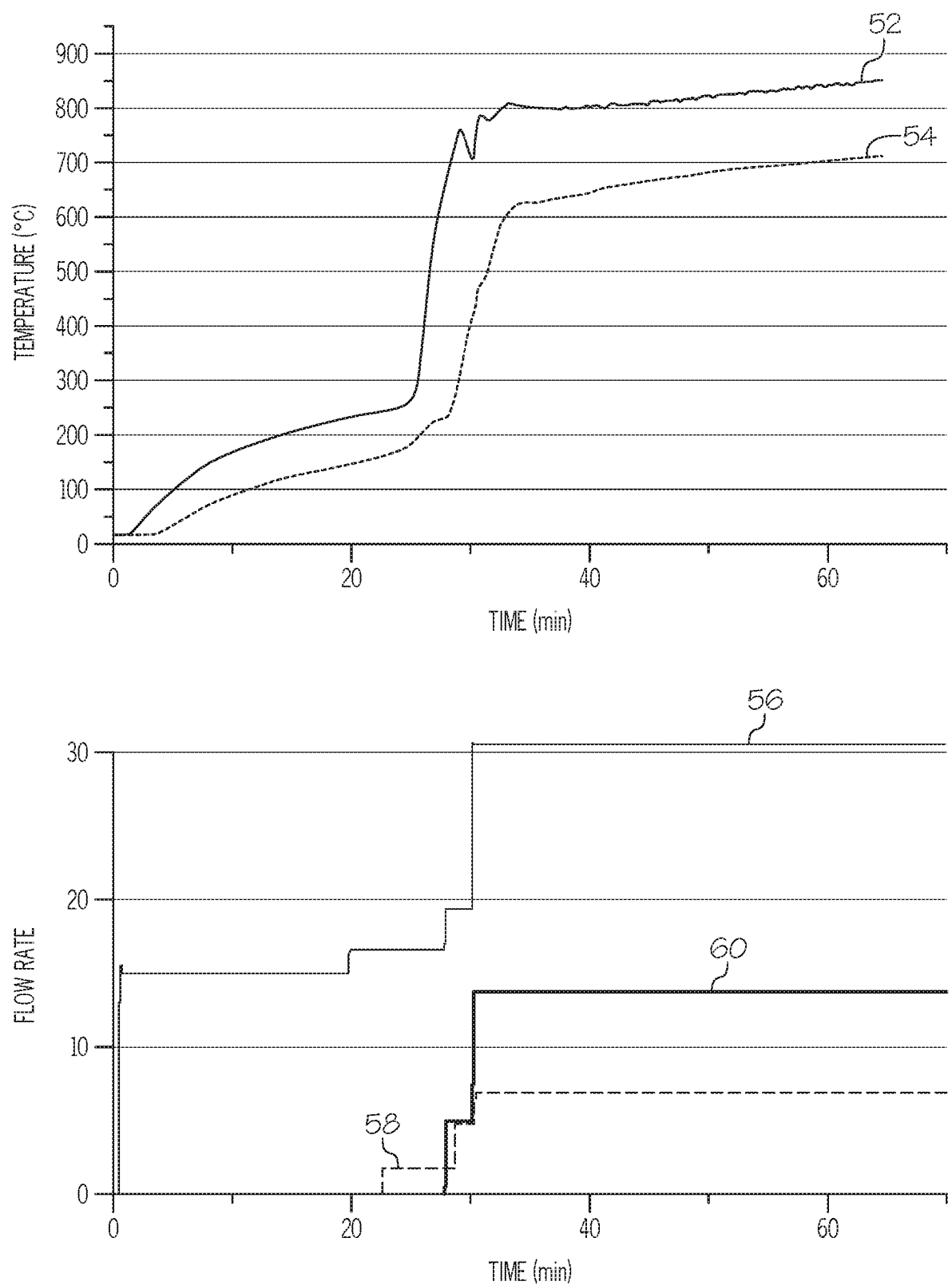
FIG. 3 is a composite chart of flowrate of the fluid (lower y-axis) and temperature (upper y-axis) over time (x-axis) according to embodiments described herein where the first fluid is air, the cooling fluid is water, and the fuel is diesel.

FIG. 3 is a chart similar to that provided in FIG. 2. Temperatures at temperature probe 36 and temperature probe 40 are shown in the upper panel of FIG. 3 as 52 and 54, respectively. The bottom panel of FIG. 3, with time aligned between the top and bottom panels, shows the air flow rate trace 56, the diesel flow rate trace 58, and the water flow rate trace 60. Further Table 1 summarizes the conditions and timing of an exemplary diesel fuel reformation. As can be seen from FIG. 3, the target temperature of 800° C. was reached within 40 minutes by first heating the air and then initiating the partial oxidation reaction by supplying diesel fuel to the autothermal reformer preheated with the air. Referring to Table 1, an electric coil was used for heating the air that was then passed through the autothermal reformer in Stage 1. A temperature probe was used to measure the temperature of the air coming from the exit end of the autothermal reformer. When this temperature, $T_2$, was detected to exceed 250° C., a partial oxidation process was initiated by starting flow of diesel to the autothermal reformer in Stage 2. Once $T_2$ was measured to exceed 500° C., the amount of diesel fuel added to the system was increased stepwise gradually such that the intensity of the partial oxidation process was increased, and the electric coil was deactivated concurrently in Stage 3. Once $T_2$ was detected to exceed 650° C., the diesel fuel and air supplies were increased stepwise gradually and water was added in Stage 4. Temperature probes were also placed before ($T_3$) and after ($T_4$) the post reformer. When $T_4$ was detected to exceed 400° C., the diesel fuel, water, and air were considered sufficiently supplied such that the full autothermal reforming reaction was initiated (Stage 5).

TABLE 1

| Stage | Temperature Conditions | Electric Coil State | Remarks |
| --- | --- | --- | --- |
| 1. Initial heating with coil | Ambient | On | |
| 2. Partial oxidation with coil | $T_2 > 250°$ C. | On | GHSV[1] 5000 h$^{-1}$ OCR[2] 1.5 |
| 3. Partial oxidation without coil | $T_2 > 500°$ C. | Off | GHSV 5000 h$^{-1}$ OCR 1.5 |
| 4. Semi-autothermal reaction | $T_2 > 650°$ C. | Off | GHSV 8000 h$^{-1}$ OCR 0.6 SCR[3] 1.0 |

TABLE 1-continued

| Stage | Temperature Conditions | Electric Coil State | Remarks |
|---|---|---|---|
| 5. Full operation | $T_4 > 400°$ C. | Off | GHSV 16500 $h^{-1}$ OCR 0.7 SCR 2.5 |

[1]GHSV = gas hourly space velocities in units of/hour ($h^{-1}$);
[2]OCR = oxygen-to-carbon ratio (supplied $O_2$ [mol] divided by total carbon at fuel [mol], unitless);
[3]SCR = steam-to-carbon ratio (supplied $H_2O$ [mol] divided by total carbon at fuel [mol], unitless)

As described above, according to one or more embodiments, the diesel reformer is initially heated to the operating temperature using heat provided by a heating element 12, followed by the heat generated by the exothermic partial oxidation of a small amount of the fuel to be reformed. Then, the supply of fuel, cooling fluid, and a fluid containing oxygen may be adjusted appropriately to allow both partial oxidation and autothermal reforming to occur using a single catalyst. Thus, the start-up process of the diesel reformer, as described herein, includes an external heat transfer stage using a fluid, such as air, and a heating element; a temperature-elevation stage to increase the temperature of the reforming catalyst using a partial oxidation reaction of the fuel, such as diesel; and a temperature stabilization and full operation stage using the fuel, the fluid containing oxygen, and the cooling fluid. Because the heat necessary for starting the diesel reformer is, in large part, provided by a reaction using the autothermal reformer catalyst, the start-up time may be significantly shortened compared with systems using only an external heat source, and fine temperature control is also possible, as described herein.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

ASPECTS

According to a first aspect, either alone or in combination with any other aspect, a method of starting a fuel reformer, which includes a heating element and an autothermal reformer disposed at a rear end of the heating element, includes (I) contacting a first fluid comprising oxygen with the heating element, (II) passing the first fluid into the autothermal reformer to preheat a reformer catalyst contained within the autothermal reformer to a first temperature, (III) reducing flow of the first fluid into the autothermal reformer, (IV) introducing a fuel into the autothermal reformer subsequent to preheating the reformer catalyst to initiate a partial oxidation reaction within the autothermal reformer to generate additional heat, (V) increasing flow of the fuel and the first fluid to initiate autothermal reforming, and (VI) controlling the temperature of the reformer catalyst by supplying a cooling fluid, the first fluid, and the fuel to the autothermal reformer and adjusting flow of each of the cooling fluid, the first fluid, and the fuel.

According to a second aspect, either alone or in combination with any other aspect, the first fluid is air.

According to a third aspect, either alone or in combination with any other aspect, the fuel is diesel.

According to a fourth aspect, either alone or in combination with any other aspect, the cooling fluid comprises water.

According to a fifth aspect, either alone or in combination with any other aspect, step V comprises increasing flow of the fuel and the first fluid in a stepwise manner.

According to a sixth aspect, either alone or in combination with any other aspect, step V comprises initiating the increase of the flow of the fuel prior to initiating the increase in the flow of the first fluid.

According to a seventh aspect, either alone or in combination with any other aspect, step V is initiated upon verification of initiation of the partial oxidation reaction within the autothermal reformer.

According to an eighth aspect, either alone or in combination with any other aspect, the fuel reformer further includes a nozzle disposed at a front end of the heating element, the nozzle configured to supply the first fluid and the fuel to the fuel reformer.

According to a ninth aspect, either alone or in combination with any other aspect, the nozzle is a two-fluid nozzle.

According to a tenth aspect, either alone or in combination with any other aspect, the autothermal reformer comprises a monolithic catalyst.

According to an eleventh aspect, either alone or in combination with any other aspect, the monolithic catalyst comprises nickel.

According to a twelfth aspect, either alone or in combination with any other aspect, the method further comprises terminating operation of the heating element after the reformer catalyst reaches a second temperature, wherein the second temperature is greater than the first temperature.

According to a thirteenth aspect, either alone or in combination with any other aspect, the cooling fluid comprises water and wherein the water is heated to the second temperature exterior to the autothermal reformer prior to the supplying the cooling fluid to the autothermal reformer.

According to a fourteenth aspect, either alone or in combination with any other aspect, the first temperature is 200° C. to 300° C. and the second temperature is 450° C. to 550° C.

According to a fifteenth aspect, either alone or in combination with any other aspect, the first fluid in steps I and II is recirculated from an outlet of the fuel reformer to an inlet of the fuel reformer.

According to a sixteenth aspect, either alone or in combination with any other aspect, a method of starting a diesel fuel reformer, which includes a heating element and an autothermal reformer disposed at a rear end of the heating element, includes (I) contacting air with the heating element and the autothermal reformer to preheat a reformer catalyst contained within the autothermal reformer to a first temperature, (II) reducing flow of the air into the autothermal reformer, (III) introducing diesel into the autothermal reformer subsequent to preheating the reformer catalyst to initiate a partial oxidation reaction within the autothermal reformer to generate additional heat, (IV) increasing flow of the diesel and the air to initiate autothermal reforming, and (V) controlling the temperature of the reformer catalyst by supplying a cooling fluid comprising water, the air, and the diesel to the autothermal reformer and adjusting flow of each of the water, the air, and the diesel.

According to a seventeenth aspect, either alone or in combination with any other aspect, step IV comprises increasing flow of the diesel and the air in a stepwise manner.

According to an eighteenth aspect, either alone or in combination with any other aspect, step IV comprises initiating the increase of the flow of the diesel prior to initiating the increase in the flow of the air.

According to a nineteenth aspect, either alone or in combination with any other aspect, step IV is initiated upon verification of initiation of the partial oxidation reaction within the autothermal reformer.

According to a twentieth aspect, either alone or in combination with any other aspect, the method further comprises terminating operation of the heating element after the reformer catalyst reaches a second temperature, wherein the second temperature is greater than the first temperature.

According to a twenty-first aspect, either alone or in combination with any other aspect, the first temperature is 200° C. to 300° C. and the second temperature is 450° C. to 550° C.

According to a twenty-second aspect, either alone or in combination with any other aspect, the air in step I is recirculated from an outlet of the diesel fuel reformer to an inlet of the diesel fuel reformer.

What is claimed is:

1. A method of starting a fuel reformer, the fuel reformer including a heating element and an autothermal reformer disposed at a rear end of the heating element, the method comprising in this order of steps:
   I. contacting a first fluid comprising oxygen with the heating element;
   II. passing the first fluid into the autothermal reformer to preheat a reformer catalyst contained within the autothermal reformer to a first temperature;
   III. reducing flow of the first fluid into the autothermal reformer;
   IV. introducing a fuel into the autothermal reformer subsequent to preheating the reformer catalyst to initiate a partial oxidation reaction within the autothermal reformer to generate additional heat;
   V. increasing flow of the fuel and the first fluid to initiate autothermal reforming; and
   VI. controlling the temperature of the reformer catalyst by supplying a cooling fluid, the first fluid, and the fuel to the autothermal reformer and adjusting flow of each of the cooling fluid, the first fluid, and the fuel.

2. The method of claim 1, wherein the first fluid is air.

3. The method of claim 1, wherein the fuel is diesel.

4. The method of claim 1, wherein the cooling fluid comprises water.

5. The method of claim 1, wherein step V comprises increasing flow of the fuel and the first fluid in a stepwise manner.

6. The method of claim 1, wherein step V comprises initiating the increase of the flow of the fuel prior to initiating the increase in the flow of the first fluid.

7. The method of claim 1, wherein step V is initiated upon verification of initiation of the partial oxidation reaction within the autothermal reformer.

8. The method of claim 1, wherein the fuel reformer further includes a nozzle disposed at a front end of the heating element, the nozzle configured to supply the first fluid and the fuel to the fuel reformer.

9. The method of claim 8, wherein the nozzle is a two-fluid nozzle.

10. The method of claim 1, wherein the autothermal reformer comprises a monolithic catalyst.

11. The method of claim 10, wherein the monolithic catalyst comprises nickel.

12. The method of claim 1, further comprising terminating operation of the heating element after the reformer catalyst reaches a second temperature, wherein the second temperature is greater than the first temperature.

13. The method of claim 12, wherein the cooling fluid comprises water and wherein the water is heated to the second temperature exterior to the autothermal reformer prior to the supplying the cooling fluid to the autothermal reformer.

14. The method of claim 12, wherein the first temperature is 200° C. to 300° C. and the second temperature is 450° C. to 550° C.

15. The method of claim 1, wherein the first fluid in steps I and II is recirculated from an outlet of the fuel reformer to an inlet of the fuel reformer.

16. A method of starting a diesel fuel reformer, the diesel fuel reformer including a heating element and an autothermal reformer disposed at a rear end of the heating element, the method comprising in this order of steps:
   I. contacting air with the heating element;
   II. passing the air into the autothermal reformer to preheat a reformer catalyst contained within the autothermal reformer to a first temperature;
   III. reducing flow of the air into the autothermal reformer;
   IV. introducing diesel into the autothermal reformer subsequent to preheating the reformer catalyst to initiate a partial oxidation reaction within the autothermal reformer to generate additional heat;
   V. increasing flow of the diesel and the air to initiate autothermal reforming; and
   VI. controlling the temperature of the reformer catalyst by supplying a cooling fluid comprising water, the air, and the diesel to the autothermal reformer and adjusting flow of each of the cooling fluid, the air, and the diesel.

17. The method of claim 16, wherein step V comprises increasing flow of the diesel and the air in a stepwise manner.

18. The method of claim 16, wherein step V comprises initiating the increase of the flow of the diesel prior to initiating the increase in the flow of the air.

19. The method of claim 16, wherein step V is initiated upon verification of initiation of the partial oxidation reaction within the autothermal reformer.

20. The method of claim 16, further comprising terminating operation of the heating element after the reformer catalyst reaches a second temperature, wherein the second temperature is greater than the first temperature.

21. The method of claim 20, wherein the first temperature is 200° C. to 300° C. and the second temperature is 450° C. to 550° C.

22. The method of claim 16, wherein the air in step I is recirculated from an outlet of the diesel fuel reformer to an inlet of the diesel fuel reformer.

* * * * *